United States Patent [19]

Crawford

[11] Patent Number: 4,652,930
[45] Date of Patent: Mar. 24, 1987

[54] TELEVISION CAMERA STRUCTURE

[75] Inventor: Christopher L. Crawford, Middletown, Pa.

[73] Assignee: RCA Corporation, Princeton, N.J.

[21] Appl. No.: 672,959

[22] Filed: Nov. 19, 1984

[51] Int. Cl.$^4$ ............................................. H04N 5/26
[52] U.S. Cl. .................................. 358/227; 358/229; 358/249; 335/210
[58] Field of Search ............... 358/217, 228, 225, 227, 358/229, 249, 251, 237, 247; 335/210; 313/371

[56] References Cited

U.S. PATENT DOCUMENTS

| | | | |
|---|---|---|---|
| 2,681,947 | 6/1954 | Jackson et al. | 178/7.2 |
| 3,008,002 | 11/1961 | Kingsbury | 178/7.2 |
| 3,973,231 | 8/1976 | Saito et al. | 335/210 |
| 4,228,458 | 10/1980 | Yamauchi et al. | 358/55 |
| 4,369,470 | 1/1983 | Contant | 358/227 |
| 4,485,407 | 11/1984 | Böhm et al. | 358/229 |
| 4,499,504 | 2/1985 | Edakubo et al. | 358/335 |
| 4,534,632 | 8/1985 | Laviolette | 354/81 |

FOREIGN PATENT DOCUMENTS 598517  2/1948  United Kingdom ............... 358/249

*Primary Examiner*—Robert G. Lev
*Attorney, Agent, or Firm*—Joseph S. Tripoli; George E. Haas; William Squire

[57] ABSTRACT

A television camera includes a front bracket to which the pickup lens is secured. A pickup tube and yoke assembly including a yoke holder are slidably attached to the bracket in a mating circular cylindrical cavity. The tube is back focussed along the lens optical axis by a camming mechanism coupled between the bracket and the yoke holder. The yoke holder has a flange attached to the camming mechanism, the flange having a plurality of alignment slots for angularly positioning the pickup tube relative to the pickup lens.

15 Claims, 9 Drawing Figures

TELEVISION CAMERA STRUCTURE

This invention relates to a television camera structure and more particularly, to a back focussing structure.

In a television camera the image pickup tube is carried in a television deflection yoke comprising windings contained within an outer circular cylindrical electrical shield. The tube is secured to the yoke by a screw operated hose type clamp. The camera also includes a housing to which the image pickup lens is attached, the pickup lens defining an optical pickup axis. The housing includes structure for securing the yoke and pickup tube on the optical axis.

One requirement of this assembly is that the pickup tube be "back" focussed relative to the pickup lens during camera assembly. What this means is that the tube and yoke assembly are required to be displaced relative to the lens parallel to the lens optical axis to locate the pickup tube target at the focal plane of the lens. The pickup lens also includes self-contained focussing elements for "front" focussing during normal use of the camera by the camera operator.

An additional requirement of camera assembly is that the tube be accurately angularly oriented relative to the pickup lens to position the focussed image on the target of the pickup tube. By way of example, in a surveillance application, the camera housing may be mounted in a number of positions; however, the tube must be positioned within the housing so as to produce a picture which is not rotated 90° or 180° with respect to the image. This adjustment requires angular positioning of the tube relative to the lens. Any misorientation of the pickup tube in the angular direction about the optical axis will produce a correspondingly misoriented picture. Therefore, the back focussing mechanism should consider both alignments.

In U.S. Pat. No. 4,369,470 a lever adjustment device is described for focussing the pickup tube relative to the pickup lens. To insure proper angular orientation of the tube relative to the axis, a bracket is cemented to the yoke shield, the bracket having a given angular orientation relative to the optical axis to prevent pickup tube rotation. However, this arrangement is not entirely satisfactory for those implementations which require the camera housing to be positioned in more than one angular orientation.

In U.S. Pat. No. 2,681,497 a television camera assembly is disclosed in which the housing includes a pair of saddle members and a bell crank lever which bears against an associated annular member to hold the pickup tube in position. The tube can be rotated within the saddle members and moved longitudinally to adjust its axial position. The pickup tube, saddle members, lever, amplifiers, and other ancillary equipment are all mounted in a box. If it is necessary to change a pickup tube, this system requires replacement of the box with another box in which the pickup tube, amplifier, and ancillary equipment have been preadjusted. This latter construction is rather complex, costly, and cumbersome to implement especially in the case of a simple tube replacement or adjustment.

In other implementations, tube replacement is relatively difficult, requiring disassembly of the prefocussed tube assembly disrupting the back focussed alignment. Other arrangements do not readily lend themselves to rapid simple angular alignment of the tube. Still other arrangements place the tube in complex structures making access to the tube for replacement or alignment relative to the pickup lens difficult. No single prior art structure addresses all of the alignment requirements of the tube with ease and simplicity.

According to the present invention, a television camera structure is adapted to receive a pickup tube and deflection yoke coupled to the tube on a given optical axis. The structure comprises a lens support bracket for receiving and securing a pickup lens on the axis, the lens for projecting an image onto the received tube. A circular cylindrical member is adapted to receive and secure a circular cylindrical yoke therein. Locating means is secured to the bracket adapted for axially and rotationally receiving the yoke securing member so that the member can be moved relative to the bracket in a direction parallel to the axis and can be rotated relative to the bracket about the axis to a plurality of predetermined angular positions. Yoke displacement means coupled to the locating means are adapted to secure the member thereto in the predetermined angular position. The displacement means axially incrementally moves the angularly located member relative to the bracket in a direction parallel to the axis to set the back focus position of the pickup tube. Tube replacement can be made by removing the tube without upsetting the displacement means position.

Figure 1:
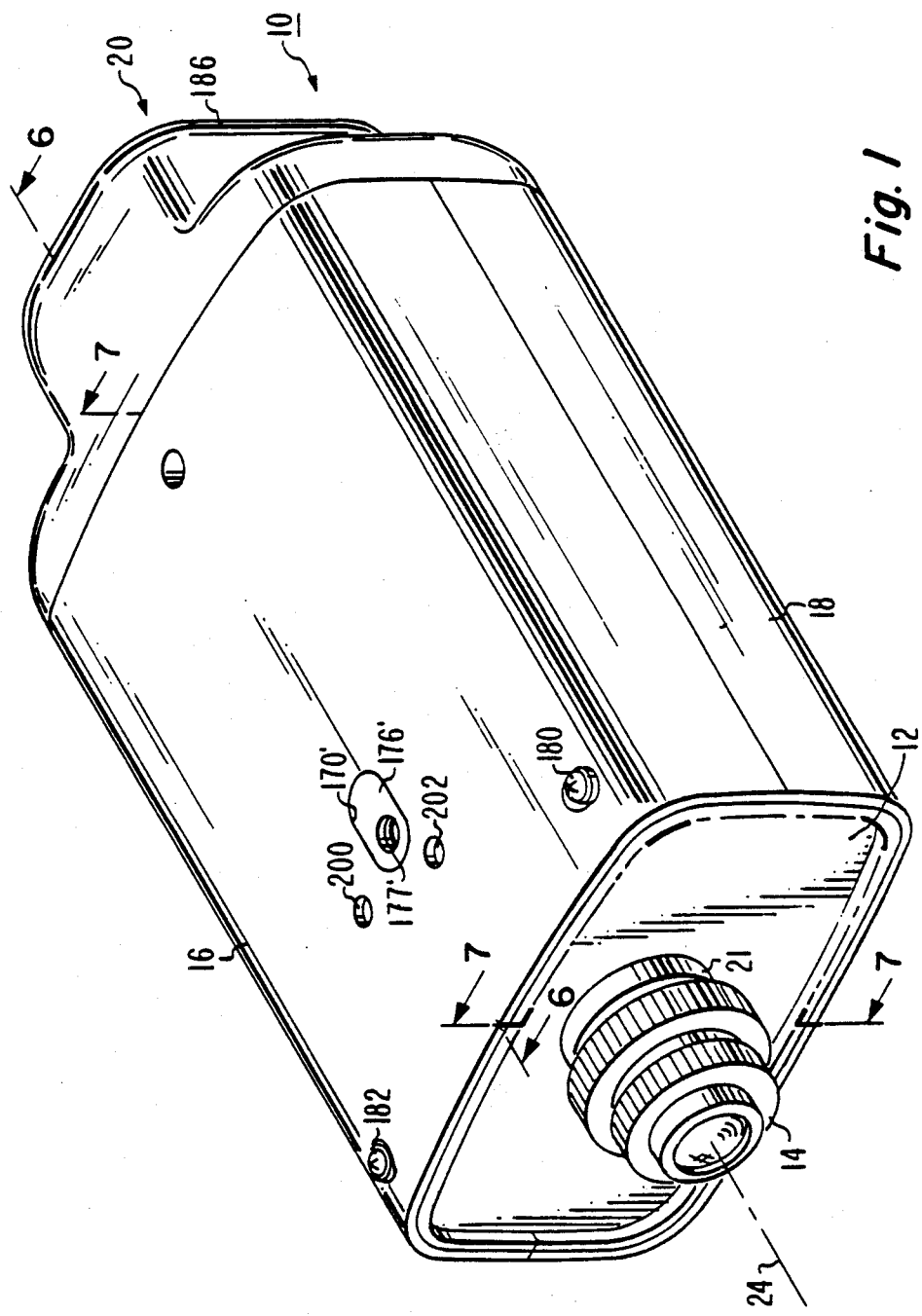
FIG. 1 is an isometric view of a camera structure according to one embodiment of the present invention.

In FIG. 1, camera 10 includes a front bracket plate 12 which may be cast metal to which is secured pickup lens assembly 14 and respective upper and lower covers 16 and 18. Transformer assembly 20 is secured to covers 16 and 18 at the camera rear. Not shown is a decorative cover which snaps in place over plate 12 and latches behind assembly 14.

Figure 3:
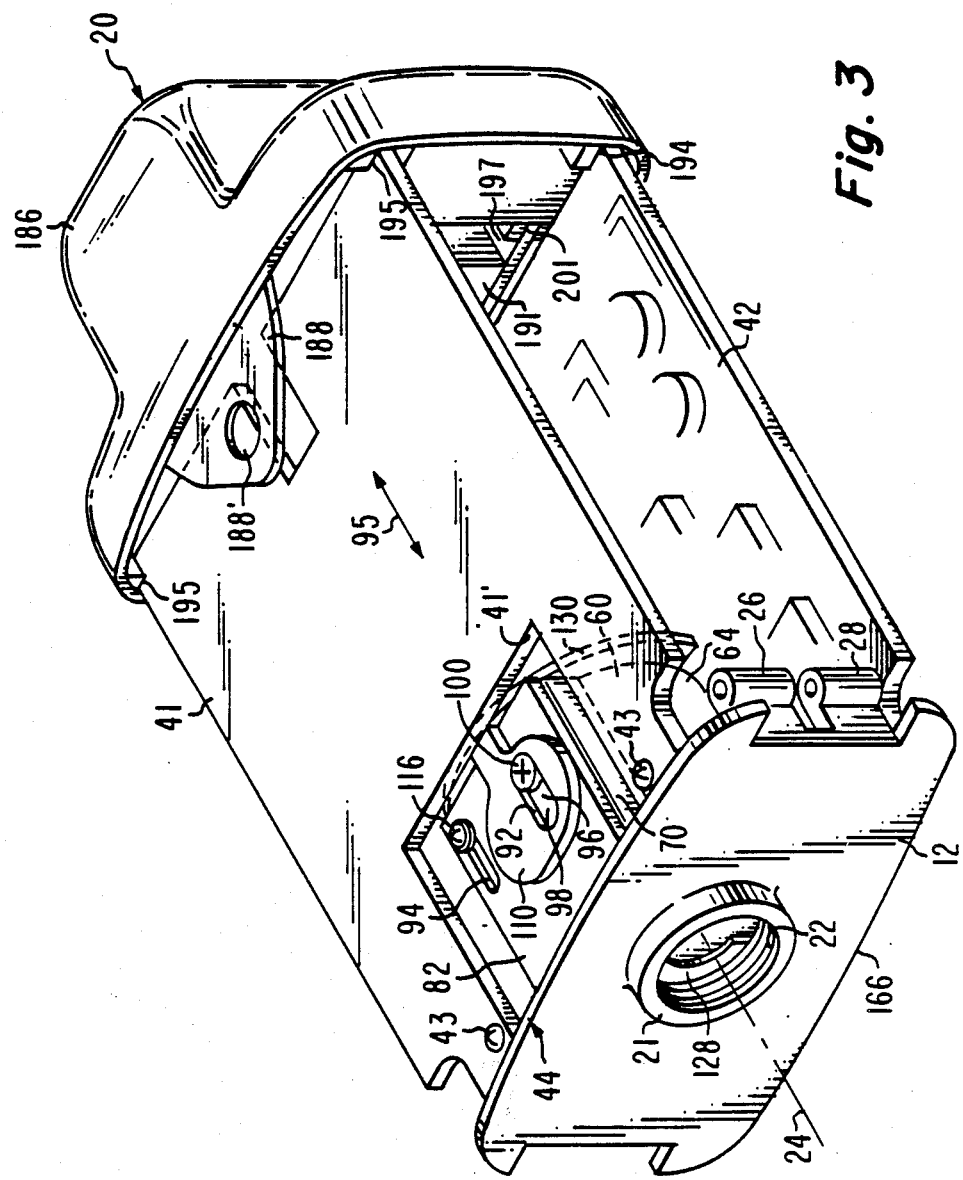
FIG. 3 is an isometric view of the embodiment of FIG. 1 without the pickup lens and outside covers.

In more detail, plate 12, FIG. 3, includes a pickup lens receiving projection 21 having an internally threaded aperture 22 for receiving and aligning the optic axis of pickup lens assembly 14, FIG. 1, concentric with axis 24. Plate 12, FIGS. 3 and 5, includes four cantilevered apertured ears 26, 28, 30, and 32. The apertures of ears 26 and 28 are aligned and the apertures of ears 30 and 32 are aligned. Ears 26 and 30 are coplanar and ears 28 and 32 are coplanar. Plate 12, FIG. 5, includes cantilevered apertured ears 34, 36, 38, and 40. Ear pair 34 and 38 is coplanar and ear pair 36 and 40 is coplanar.

Figure 2:
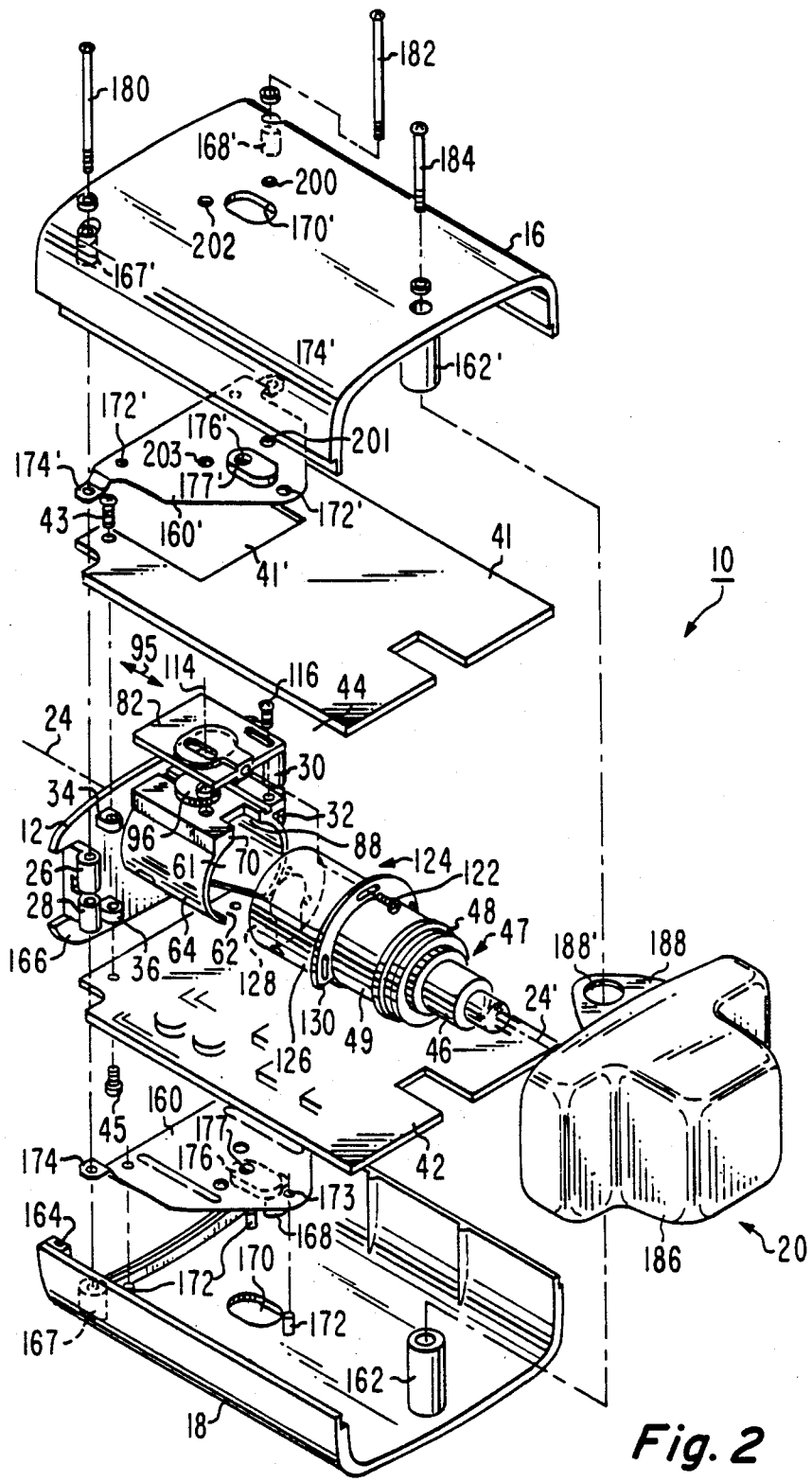
FIG. 2 is an exploded isometric view of the embodiment of FIG. 1.
Figure 4:
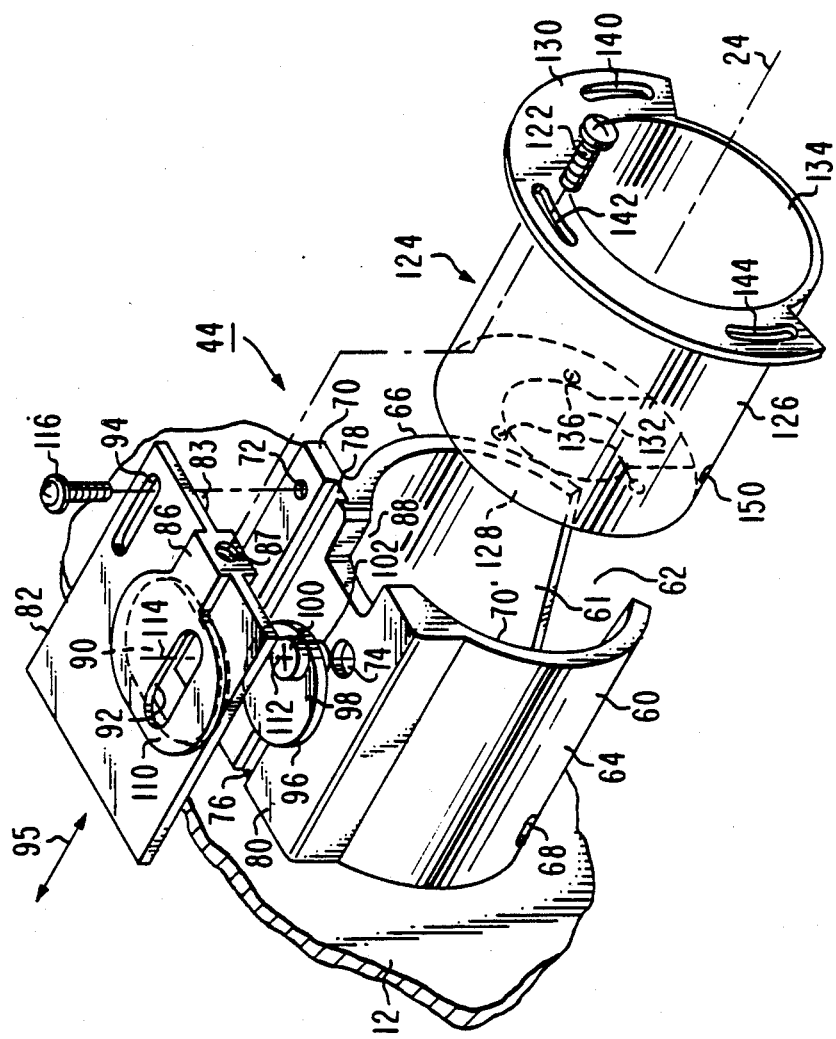
FIG. 4 is an isometric view of the pickup tube and deflection yoke receiving and adjustment structure.

In FIGS. 2 and 4, back focussing adjustment mechanism 44 is secured to plate 12. Mechanism 44 aligns tube and yoke assembly 47 on the optic axis 24 and adjusts the axial position of tube and yoke assembly 47 parallel to axis 24 for back focussing the tube relative to lens assembly 14, FIG. 1. Mechanism 44 also permits rotation of assembly 47 about the optic axis 24.

The adjustment mechanism 44, FIG. 4, includes tubelike structure 60 which extends from and is normal to plate 12 and has a circular cylindrical cavity 61. Structure 60 has first and second arcuate side walls 64 and 66 having an axially extending V-shaped opening 62, the opening tapering toward its apex as it approaches plate 12. Side wall 64 has a screw access slot 68. Plate 70 connects walls 64 and 66 opposite opening 62. Plate 70 has an opening 88, a plane outer surface 80 and a circular cylindrical inner surface 70' forming a continuous circular cylindrical surface with walls 64 and 66 defining cavity 61. Surface 80 is normal to plate 12 and parallel to axis 24. A threaded aperture 72, a circular cylindrical aperture 74, and a pair of axial extending grooves 76 and 78, parallel to axis 24, are in plate surface 80.

Figure 9:
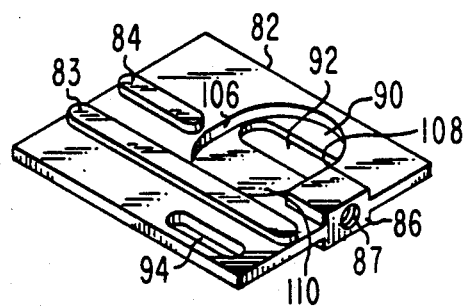
FIG. 9 is an underside isometric view of the slider element employed in the embodiment of FIG. 3.

Mechanism 44 includes a slider 82, which slides on surface 80 in axial directions 95 parallel to axis 24. Slider 82, FIGS. 4 and 9, includes a rib 83, which is closely received within and slides in groove 78, and a rib 84 which is closely received in and slides in groove 76. Slider 82 has a boss 86, which moves within plate 70 opening 88. Boss 86 has an axially extending threaded aperture 87. Slider 82 has a camming recess 90, located offset from a line through boss 86 and rib 84. Recess 90 has side walls 106 and 108 and bottom wall 110. Elongated slot 92 parallel to axis 24 is in wall 110. Slider 82 has a second slot 94 parallel to ribs 83 and 84. Slider 82 is movable in directions 95, relative to surface 80 and plate 12. Slider 82 may be molded from thermoplastic material.

In FIG. 4, cam element 96 includes a relatively large circular cylindrical camming disc 98 from which extend in respective opposite directions two aligned smaller circular cylindrical discs 100 and 102. Discs 100 and 102 are concentric about axis 114 offset from the disc 98 central axis. Disc 102 is a journal which is closely received in aperture 74 for rotation about axis 114. Disc 100 is a drive member having screwdriver slot 112 and is closely received in slot 92 of slider 82. Disc 98 is located in slider recess 90, FIG. 9, abuts recess 90 walls 106 and 108, and is captured between surface 80 and slider wall 110, FIG. 4.

Disc 98 slides against and cams the side walls 106 and 108 when rotated. Rotation of the camming element 96 about axis 114 causes the eccentricity of disc 98 relative to axis 114 to displace slider 82 in one of directions 95. Screw 116 passes through slider 82 slot 94 and is threaded to aperture 72 to lock slider 82 in any given axial position as determined by the relative angular orientation of camming element 96.

In FIGS. 2 and 4, tube and yoke assembly 47 includes yoke holder 124, pickup tube 46 and yoke 48. Yoke holder 124 comprises a circular cylindrical tube-like member 126, a radially inwardly extending flange 128 at one end and a radially outwardly extending flange 130 at the other end. Holder 124 may be thin walled molded thermoplastic material.

Figure 6:
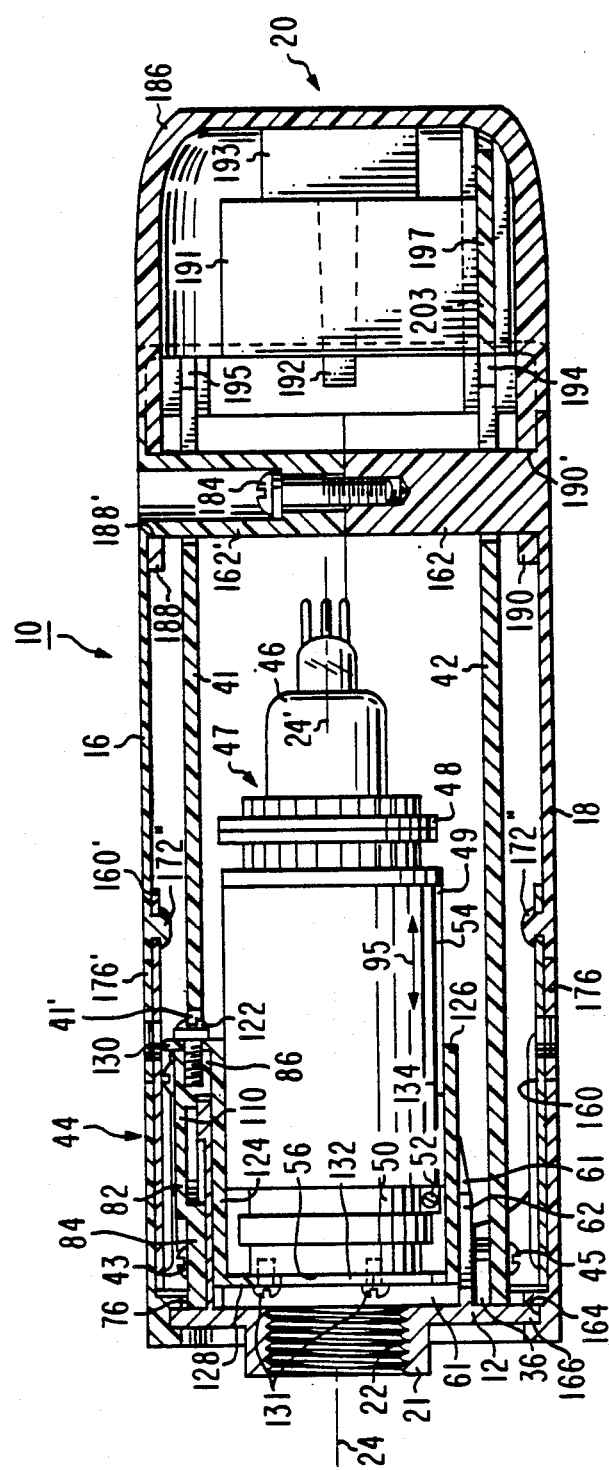
FIG. 6 is a side elevation sectional view of the embodiment of FIG. 1 taken along lines 6—6.
Figure 7:
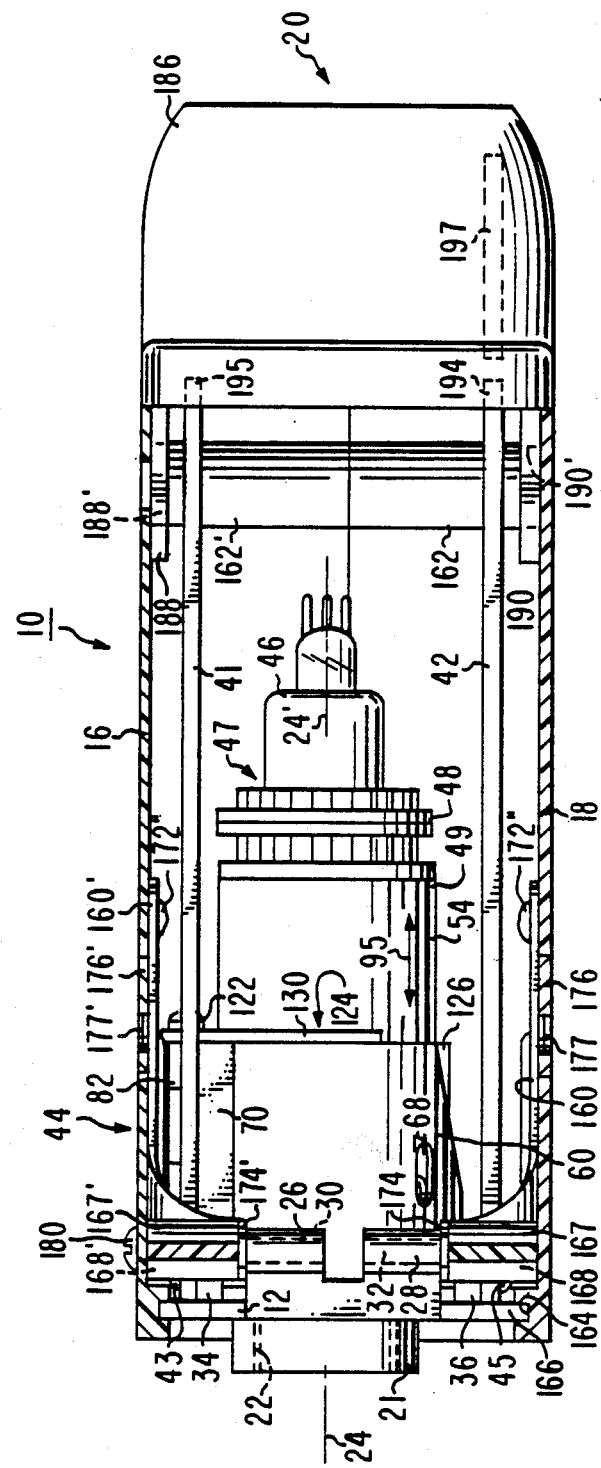
FIG. 7 is a side elevation sectional view taken along lines 7—7 of FIG. 1.

In FIGS. 2, 6, and 7 pickup tube 46 having a circular cylindrical glass envelope and a longitudinal axis 24' is closely received in the circular cylindrical core of yoke 48. The yoke 48 includes a plurality of windings (not shown) and an outer shield 49. Shield 49 has a circular cylindrical outer surface 54 concentric with the received tube axis 24'. In FIG. 6, tube 46 is closely received in and clamped to yoke 48 by an annular hose-type clamp 50 via screw 52, the tube pickup window (not shown) abutting the yoke front face wall 56. Wall 56 has an opening to permit an image from lens assembly 14, FIG. 1, to be projected onto the pickup tube through the pickup window.

Yoke 4 is closely slidably received within the cylindrical cavity 134 of member 126, FIGS. 4 and 6, until the yoke wall 56, FIG. 6, abuts flange 128. Three screws 131, two being shown in FIG. 6, attach flange 128 to the yoke 48 wall 56 via screw apertures 136 in flange 128, FIG. 4. The inwardly extending flange 128 includes a central aperture 132 for permitting the image from the pickup lens 14, FIG. 1, to be projected onto the pickup tube 46, FIG. 2. The member 126 side wall has an opening 150, FIG. 4, providing access to screw 52, FIG. 6, through the structure 60 slot 68 with a screwdriver.

Figure 8:
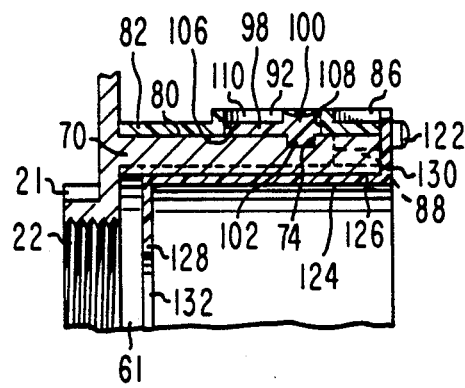
FIG. 8 is a sectional view through the adjustment structure of FIG. 3 taken along lines 8—8.

Flange 130, FIG. 4, includes three spaced elongated arcuate openings 140, 142, and 144. Openings 140 and 144 are diametrically opposite. Opening 142 is centered 90° relative to axis 24 between the openings 140 and 144. Flange 130 abuts the slider 82 end face at boss 86 and is locked to slider 82 by screw 122 engaged with aperture 87, FIGS. 8 and 9. The angular position of yoke holder 124 relative to axis 24 is determined by which of openings 140, 142, or 144 are aligned with aperture 87. Further, the openings 140, 142, and 144 are each of sufficient length to permit some rotation of the yoke holder 124 about axis 24, e.g., about 10°, and thus permitting fine adjustment of the angular orientation of the pickup tube 46, FIGS. 2 and 6, relative to axis 24.

The length of member 126, FIGS. 4 and 6, in directions 95 is sufficient to permit axial displacement within the expected adjustment range needed to back focus the attached pickup tube 46. The amount of the adjustment range may be set in accordance with a given implementation. Element 96, FIG. 4, has sufficient eccentricity to move slider 82 in directions 95 an amount necessary to achieve anticipated focussing of the tube 46 relative to the focal plane of the pickup lens of assembly 14, FIG. 1.

Should the focussed and correctly oriented tube 46 need to be replaced, it is required that the clamp 50, FIG. 6, be loosened so that the tube can be removed from the yoke 48. It is also desirable that the tube 46 be removed from yoke 48 without disturbing the yoke orientation and focus position. To remove tube 46, FIG. 4, screw 52 is loosened via access slot 68 in wall 60 and hole 150 in holder 124. This permits simple tube replacement without the need for refocussing the tube since yoke holder 124 need not be disturbed. The replacement tube is oriented angularly in yoke holder 124 manually and then locked to yoke 48 via screw 52. In some cases, holder 124 may be disturbed angularly in replacing a tube. This is acceptable as it is a simple procedure to relocate the angular position of the assembly.

At certain other times it is desired to remove the yoke and tube assembly 47 without disturbing their preadjusted focussed position. The adjustment mechanism, FIG. 4, permits removal of the yoke assembly 47 without disturbing the back focus settings as will be described.

Member 126 of assembly 47, FIGS. 6 and 7, is slid axially into the circular cylindrical cavity 61 of the structure 60 parallel to axis 24. The slider 82 and cam element 96 are preassembled to the structure 60 surface 80 and loosely attached with screw 116. Flange 130 of yoke holder 124, FIGS. 2 and 4, is then oriented in a predetermined angular position according to the desired relative orientation of the camera when in use. For example, with the camera horizontal as shown in FIG. 1, slot 142, FIG. 4, may be aligned with slider aperture 87. Should the camera be oriented on edge, that is, rotated 90° about the optic axis 24 from the position in FIG. 1, then one of slots 140 or 144, FIG. 4, is aligned with aperture 87. Screw 122, FIG. 2, is then loosely attached to slider 82 through a selected slot 140, 142, or 144. The assembly 47, FIG. 6, is rotated by manually grasping the flange 130. Rotation of about 10° is permitted with a screw 122 passing through one of slots 140, 142, or 144. The final alignment is made by observing the angular orientation of the resulting TV picture produced by the tube 46 relative to a reference orientation. When the picture alignment is oriented as desired, screw 122 is tightened.

Screw 116, FIG. 2, remains loose while the cam element 96 is rotated about its axis 114. The cam element is rotated until the tube 46 is focussed relative to the pickup lens of assembly 14, FIG. 1. In so doing, it is assumed that the tube 46 is electrically connected by wiring (not shown) to a suitable test apparatus and the power supply of the camera, to be explained below, is coupled in circuit to provide the test TV picture for adjustment and alignment purposes. The assembly 47, FIG. 6, is moved in one of directions 95 until the image is focussed. At this time, the screw 116, FIG. 2, is tightened, locking slider 82 to plate 70. This locks slider 82, yoke holder 124, tube 46, and yoke 48 in the desired orientation and back focussed position. By merely loosening screw 116 and rotating the cam element 96, rapid small incremental focussing adjustments in either of directions 95 may be made.

The electronics for operating the camera 10 are on the two printed circuit boards 41 and 42, FIG. 2. Printed circuit board 41, which is optional, is screwed to ears 34 and 38, FIG. 5, and board 42 is screwed to ears 36 and 40 straddling the tube, yoke, and yoke holder assembly 47. Board 41, FIGS. 2 and 3, has a clearance opening 41' for slider 82.

Figure 5:
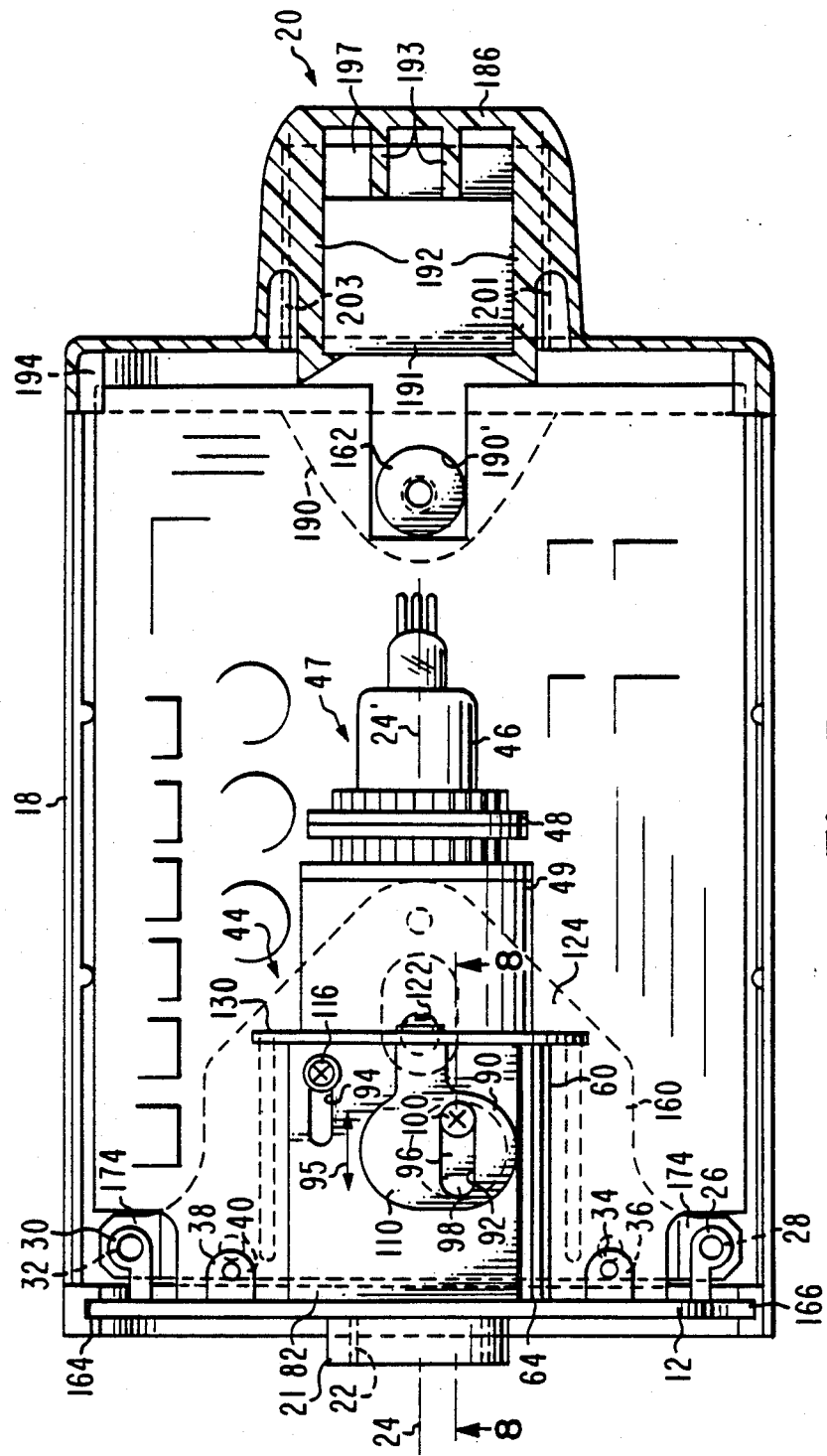
FIG. 5 is a plan view, partially in section, of the camera of FIG. 1.

Transformer assembly 20, FIGS. 3 and 6, includes a molded thermoplastic housing 186 having a pair of aligned legs 188 and 190. Legs 188 and 190 have respective holes 188' and 190'. In FIG. 5, transformer housing 186 includes a a pair of cantilevered spaced latching hooks 192, spaced ribs 193, a pair of coplanar slots 201 and 203, coplanar slots 194, and coplanar slots 195. The power supply which comprises a transformer 191 secured to a printed circuit board 197 is secured in slots 201 and 203. Hooks 192, FIG. 6, latch the power supply via transformer 191 against ribs 193. The power supply powers the circuitry on the printed circuit boards and the tube 46 (indirectly) by conductors (not shown). Slots 195, FIG. 5, receive an edge of printed circuit board 41 and slots 194 receive an edge of printed circuit board 42. The transformer housing 186 abuts the rear edges of the covers 16 and 18, FIGS. 1 and 6. Legs 188 and 190 abut the inner respective surfaces of the covers 16 and 18.

Transformer assembly 20, FIGS. 2, 5, and 7, is aligned between the covers to receive respective cover stanchions 162' and 162 through legs 188 and 190 prior to the assembly of the covers 16 and 18. When the covers 16 and 18 are fastened by screws 180, 182, and 184, FIG. 2, the transformer assembly 20 and all of the elements in the camera are securely fastened in place.

Covers 16 and 18, FIG. 2, are substantially similar, enclose the printed circuit board and yoke subassembly described above, and the transformer assembly 20. The description of cover 18 is representative. The cover 18 is U-shaped and includes a metal bracket 160 secured thereto. The primed numbers on cover 16 refer to identical parts on cover 18. Cover 18 may be a thermoplastic molded shell having a cylindrical apertured stanchion 162 at one end and a peripheral channel 164 at the other end adapted to closely receive edge 166 of front plate 12. Two circular cylindrical stanchions 167 and 168 are adjacent the channel 164 on respective opposite sides of cover 18. An elongated aperture 170 is somewhat central the cover 18. Three spaced upstanding studs 172 pass through corresponding apertures 173 in bracket 160 (only two apertures being shown in FIG. 2). The protruding stud tips are deformed as at 172", FIGS. 6 and 7, to firmly secure bracket 160 in abutting relation to the cover inner surface, FIGS. 5, 6, and 7.

The bracket 160 includes two upstanding ears 174, FIGS. 2, 5, and 7, which overlay respective stanchions 167 and 168. Bracket 160 includes boss 176 having a threaded aperture 177. Boss 176 is positioned in cover opening 170 (see boss 176' shown in connection with plate 160' associated with cover 16). The threaded aperture 177 mounts the camera to a mating threaded stud (not shown) on a support. One ear 174 of bracket 160 is located between stanchion 167 and plate 12 ear 28, FIG. 7. The other ear 174 is between cover 16 stanchion 168 and ear 32 of plate 12. The ears 174' of the upper cover bracket 160' are similarly sandwiched between respective cover 18 stanchions 167' and 168' and respective ears 26 and 30 of plate 12. Screw 182, FIGS. 2 and 7, is passed through the apertures of stanchion 168', a bracket 160' ear 174', plate 12 ears 30 and 32, an ear 174 of bracket 160 and then tapped into the aperture of cover 18 stanchion 168. Screw 180 is secured to similar elements on the different parts and tapped into stanchion 167. This locks the cover 16 to the cover 18 and the corresponding brackets 160, 160' to the ears 26, 28, 30, and 32, FIGS. 2 and 5, securing the covers to plate 12.

The stanchions 162 and 162' of the respective covers 18 and 16 abut. These stanchions pass through corresponding openings in the printed circuit boards 41 and 42 and holes 188' and 190' of transformer housing 120, FIG. 7. Screw 184, FIGS. 2 and 7, passes through stanchion 162' and is tapped into the aperture of stanchion 162.

In FIG. 1, cover 16 includes a pair of adjustment access apertures 200 and 202. Aperture 200 provides access to slider 82 locking screw 116, FIGS. 2 and 3, and aperture 202 provides access to camming element 96. Bracket 160', FIG. 2, also includes access apertures 201 and 203 aligned with respective apertures 200 and 202. Thus the tube and yoke assembly 47, FIGS. 6 and 7, can be back focussed with the covers 16 and 18 and the transformer assembly 20 attached. In addition, by merely disassembling the covers 16 and 18 and the transformer assembly 20 which is modular, the pickup tube 46 may be disassembled from the yoke 48, FIG. 4, via access aperture 68 in structure 60. Thus, various portions of the assembly may be disassembled and/or adjusted using relatively few components and few screws.

The angular position of the tube 46, FIG. 2, may be adjusted to any one of three orientations as determined by the locations of slotted openings 140, 142, and 144 in yoke holder 124, FIG. 4. Thus, the picture presented by the tube 46, FIG. 2, may be placed at three orientations ±90° within a ±5° adjustment range at each orientation as determined by the length of slots 140, 142, and 144, FIG. 4, relative to a given housing orientation. Also, the yoke holder 124 by being manually angularly adjustable by grasping flange 130, is easily adjusted. This is a relatively difficult adjustment in the limited space environment of some prior art cameras.

It is to be understood that the yoke holder 124 closely receives the yoke and, in turn, is closely received within the structure 60 cylindrical cavity to preclude undesirable play or movement between these various elements in a direction normal to axis 24. The pickup tube may be axially displaced with a relatively simple adjustment and by loosening only one screw 116. By removing the covers 16 and 18 (the transformer assembly 20 may remain in place), the yoke holder assembly 47 is removed by loosening only one screw 122. The yoke 48 position relative to the yoke holder is predetermined by the screws 132 (FIG. 6) which are located in mating screw holes in the yoke 48 front face. This accurately aligns the yoke relative to the holder 124.

What is claimed is:

1. A television camera structure adapted to receive an image pickup tube and a yoke coupled to the tube on a given optical axis comprising:
   a planar lens support bracket for receiving and securing an image pickup lens on said axis, said lens for projecting said image onto said received tube;
   a circular cylindrical member adapted to receive and secure said yoke thereto;
   member locating means secured to and cantilevered from said bracket adapted for axially and rotationally receiving said yoke securing member so that said member can be moved relative to the bracket in a direction parallel to said axis and can be rotated relative to the bracket about said axis to a plurality of predetermined angular positions;
   yoke displacement means coupled to said locating means adapted to secure the member thereto in the predetermined angular position, said displacement means for axially incrementally moving said angularly located member relative to said bracket in a direction parallel to said axis to set back focus position of the pickup tube; and
   printed circuit board connecting means depending from the bracket for cantilevering at least one printed circuit board adjacent a board edge from the bracket parallel to said axis.

2. The structure of claim 1 wherein said member and said yoke displacement include cam means for camming said member in said parallel direction and means adapted to settably secure said cammed member in an angular extent relative to said axis of at least about 90°.

3. The structure of claim 1 wherein said member includes a flange portion and a cylindrical body portion, said displacement means including a slide element secured to said flange portion and slidably secured to said member locating means for movement parallel to said axis, and means coupled to the bracket and element for displacing said element relative to said bracket.

4. The structure of claim 1 wherein said yoke comprises a cylindrical body having an end face, said member comprising a cylindrical body adapted to embrace said yoke body and an inwardly directed flange adapted to abut and be secured to said end face.

5. The structure of claim 1 further including camera housing means cantilevered from and embracing said bracket.

6. The structure of claim 5 further including transformer housing means cantilevered from said camera housing means at a location distal said bracket, said transformer housing means and said bracket including means for securing at least one printed circuit board thereto.

7. The structure of claim 1 wherein said yoke displacement means comprises a slide element slidably secured to the bracket and having a camming slot and a cam member in said slot and rotatably secured to said bracket for camming said element relative to said bracket in response to rotation of said cam member, said yoke receiving and securing member being secured to said element for axial displacement therewith.

8. A television camera structure comprising:
   a plate member having an optical aperture lying on an axis;
   yoke holder receptacle means secured to said member adjacent to said aperture, said receptacle means defining a circular cylindrical cavity concentric with said axis;
   cam means secured to said receptacle means for reciprocative displacement parallel to said axis;
   a yoke holder adapted to receive a pickup tube yoke closely received in said receptacle means cavity and secured to said cam means for axial displacement parallel to said axis in response to said reciprocative displacement; and
   means for securing said holder in a selected one of a plurality of anglar orientations relative to said axis in an angular extent of at least 90 degrees.

9. The structure of claim 8 wherein said receptacle means includes a semicircular cylindrical member extending from said plate member, a slide element secured to said cylindrical member for axial displacement parallel to said axis, and a cam element movably secured to said cylindrical member and said slide element for axially displacing said slide element relative to said cylindrical member in response to movement of said cam element.

10. The structure of claim 9 wherein said yoke holder includes a circular cylindrical housing closely slidably received in said cylindrical cavity and an outwardly extending ring-like flange member adapted to be secured to said slide element.

11. The structure of claim 10 wherein said flange member is adapted to be secured in a selected one of a plurality of angular orientations relative to said axis.

12. The structure of claim 8 including connector means attached to said plate member for cantilevering at least one printed circuit board at an edge thereof and a housing at an end thereof from said plate member.

13. The structure of claim 8 wherein said yoke holder includes flange means adapted to be juxtaposed with and secured to a face of a pickup tube yoke.

14. A television camera structure comprising:
   a substantially planar image pickup lens bracket having an opening defining an optical axis for said lens;
   tube receiving means cantilevered from the bracket for rotationally and axially securing a pickup tube and yoke assembly to said bracket coaxial with said optical axis, said tube receiving means including a yoke securing member adapted to receive the yoke assembly and pickup tube, said member being rotationally and axially movably attached to said tube receiving means;
   means for securing at least one printed circuit board at one end thereof cantilevered to said bracket in spaced relation to and straddling said tube receiving means;
power supply housing means for securing the other end of said at least one circuit board in said spaced relation; and
a pair of facing covers secured at one end to and cantilevered from said bracket and at the other end to each other and adapted to secure said power supply housing means thereto at said other end.

15. The sturcture of claim 14 wherein said housing means includes latch means for releasably securing power supply means thereto.

* * * * *